2,976,262
SOLID STATE POLYMERIZATION

Yun Jen, Anaheim, Calif., and Janet L. Johnson, New Brunswick, N.J., assignors to American Cyanamid Company, New York, N.Y., a corporation of Maine No Drawing. Filed Jan. 6, 1959, Ser. No. 785,112

8 Claims. (Cl. 260—72)

The present invention relates to the preparation of solid polymers. More particularly, the invention relates to a method of making homopolymers of acrylamide and copolymers thereof with acrylic or methacrylic acid which are solid at temperatures above about 35° C. by polymerizing the monomers in the solid state, i.e., conducting the polymerization in a liquid medium which is a nonsolvent for both the monomers and the resulting polymer. The present invention is particularly advantageous for the polymerization of solid crystalline acrylamides, although the process may also be utilized with other monomers which are available as solids at room temperature. The term "acrylamides," as employed in the present invention, includes acrylamide, methacrylamide, methylol acrylamide and mixtures thereof.

The polymerization system of the present invention provides certain definite advantages over the procedures known and generally utilized by the prior art. For example, it avoids overheating during the polymerization of monomeric compounds such as takes place in bulk polymerization systems and avoids drying and recovery problems such as takes place in solution polymerization systems.

The advantages of a solid state polymerization system have been set forth in the copending application of Thomas and Friedlander, Serial No. 645,026. Polymerizations via such a system have a number of definite advantages. For example, in a system of this kind the viscosity is independent of the molecular weight. Therefore, the system need not be limited to relatively low concentrations as in solution methods; the dependence of the molecular weight of the product on the concentration of the initiator is lessened; and in particular the present nonsolvent system produces the polymer as a powdery, easily recoverable, readily dried product.

The disclosure in that copending application, Serial No. 645,026, teaches that solid polymer of the water-soluble variety may be prepared as such from solid monomers such as acrylamide, without dissolving the monomer, by reacting the monomer preferably with catalyst, in a medium which is nonsolvent for both monomer and polymer.

According to the present invention, we have discovered that a marked improvement in conversion of monomer to polymer in this solid state system may be obtained by the introduction into the system of certain dispersing agents. We have discovered, moreover, that greater conversions are obtainable by introducing into the system at an advanced stage in the polymerization a minor amount of water in quantities which are insufficient to affect the relative insolubility of the liquid organic reaction medium to the monomer and polymer in the system.

It is an object of the present invention to prepare, via a solid state reaction and at an improved conversion rate, water-soluble polymers from the corresponding water-soluble monomer. It is a more particular object of the invention to provide a means for improving the conversion rate and molecular weight of the polymer by using small amounts of water and/or certain dispersing agents in the preparation of a water-soluble polymer in a solid state polymerization system. Other objects and advantages will become apparent as the description of the invention proceeds.

Generally stated, the preferred aspects of the invention reside in adding to the polymerization system a small quantity of a dispersing agent and during the course of the polymerization, i.e., after the formation of some polymer, introducing a small quantity of water not in excess of 7%, based on the organic liquid polymerization medium. The use of either the dispersing agent or the small percentage of water in the system results in a definite advantage in product and conversion over a system in which these agents are omitted. The system with which the invention is concerned is that of the aforementioned copending application wherein a solid crystalline vinyl monomer is suspended in a nonsolvent for the monomer and reacted at a temperature below tthe melting point of the solid monomer. As polymerization of the solid monomer occurs, the polymer is produced also in the solid state. Initiation preferably takes place by the addition of a catalyst as the source of free radicals. The polymer may be a homopolymer of an acrylamide monomer as above specified or it may be a copolymer with acrylic or methacrylic acid. A desirable copolymer, for example, is one of acrylamide-acrylic acid wherein the ratio of monomers is not less than 7:3, respectively, i.e., wherein at least 70% by weight acrylamide is present.

In selecting a polymerization catalyst for use in the present invention, it is preferred that such compounds be oil-soluble to some extent. Suitable catalysts which have found utility are organic peroxides and hydroperoxides of acids having at least 4 carbon atoms, and azo compounds having the formula:

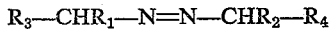

$$R_3-CHR_1-N=N-CHR_2-R_4$$

wherein $R_1$ and $R_2$ are substituents selected from the group consisting of alkyl radicals having at least 3 carbon atoms, and aralkyl radicals, and $R_3$ and $R_4$ are substituents selected from the group consisting of hydrogen, alkyl radicals, preferably those containing up to 20 carbon atoms, phenyl radicals, aralkyl radicals, alkoxy radicals, cyano radicals and halogen substituted radicals of said group. Illustrative specific examples of such compounds are cumene hydroperoxide, tertiary-butyl hydroperoxide, ditertiary-butyl peroxide, toluyl hydroperoxide, benzoyl peroxide, p-bromobenzoyl hydroperoxide, succinyl peroxide, pinane hydroperoxide, acetyl peroxide, p-methane hydroperoxide, methyl ethyl ketone peroxide, diisopropylbenzene hydroperoxide, anisoyl peroxide, 1-cyclohexanol-1-hydroperoxide, furoyl peroxide, and the like. Suitable illustrative examples of azo catalysts are such as Porofor N azo-bis(isobutyronitrile), azo-bis(diphenyl methane), 1,1-azo-bis(1-phenyl ethane), 1,1'-azo-bis(1-phenyl hexane), azo-bis(naphthyl cyclohexyl methane), azo-bis(ditolyl ethane), 1,1-azo-bis(chlorophenyl-ethane), 1,1-azo-bis(dimethoxyphenyl methane), azo-bis-1-(2-furyl)isobutane, azo-bis-α-(2-furyl)chlorophenyl ethane, azo-bis-α-(2-furyl)toluyl ethane and the like. Organic redox catalyst systems such as the benzoyl peroxide-dimethyl aniline system may also be employed. The amount of catalyst may vary over a fairly wide range. Thus, from about 0.05% to about 5% by weight based on the total weight of the polymerizable compounds may be used and generally amounts of from about 0.2% to about 3% by weight are preferred as a practical matter.

The initiation of the polymerization after the addition of the catalyst to the reaction mixture is frequently attended by a marked increase in temperature and care must be taken to remove the excessive heat generated in such cases. The total quantity of catalyst may be added initially to the reaction mixture or in small proportions during the course of polymerization. The latter method affords a convenient procedure for regulating the amount of heat produced in a given time.

As noted, the polymer which is formed is itself insoluble in the liquid medium permitting the solid polymer to be filtered off and dried to a free-flowing powder. The process provides a marked processing advantage, inasmuch as the cumbersome time-consuming materials handling problem of isolating from solution or from an emulsion is avoided and all that is required is a simple decantation and air drying.

Various nonaqueous liquid substances which may be utilized as the medium in producing the polymers according to the present invention are moderately volatile materials, preferably having a boiling point of between about 50° C. and 200° C. Among the more suitable liquid substances are the linear chain saturated hydrocarbons containing from 5–12 carbons, for example, hexane, pentane, octane, heptane and their mixtures. Substituted liquid hydrocarbon nonsolvents, and various other compounds, such as carbon tetrachloride, octyl chloride, chlorinated benzene, Nujol, a hydrocarbon mineral oil, and the like. Suitable liquids, of which the above are exemplary, are those which have the following properties: do not dissolve either the monomer or polymer; are nontoxic and inexpensive; do not substantially lower the molecular weight, i.e., are poor chain transfer agents; are volatile and therefore easily removable; and do not have a substantial swelling effect on either monomer or polymer.

In practicing the present invention, we have found that only those dispersing agents of the class of alkyl esters of an alkali metal sulfosuccinic acid salt are suitable and that various other known and available dispersants such as the alkyl and alkyl aryl sulfates and sulfonates, e.g., sodium lauryl sulfate, available as Duponol C, zinc stearate, sodium sulfate, nonyl phenol, ethylene oxide condensates, condensation products of propylene oxide and propylene glycol, known as Pluronics, stearamide, hydroxytitanium stearate, soap, e.g., Ivory flakes, for example, are ineffective. Compounds which are effective are those falling within the class of alkyl esters of alkali metal sulfosuccinic acid salts, such as diisobutyl sodium sulfosuccinate, known as Aerosol IB, dihexyl ester of sodium sulfosuccinic acid, known as Aerosol MA, dioctyl ester of sodium sulfosuccinic acid, known as Aerosol OT, N-octadecyl disodium sulfosuccinate, diheptyl ester of potassium sulfosuccinic acid, N-actadecyl tetrasodium (1,2-dicarboxyl) ethyl sulfosuccinate, diamyl lithium sulfosuccinate, bistridecyl sodium sulfosuccinate, available as Aerosol TR, and the like. The presence of these dispersants in the system, generally in amounts of from about 0.5% to about 20% and preferably from about 1% to about 15% by weight, based on the total weight of the reaction mixture, produces a definite increase in molecular weight and substantially improves conversion rates.

The quantity of water which may be introduced into the system must necessarily be small in order that the insoluble condition of the polymer and polymerizable components of the system are not affected. The amount of water which is introduced should not exceed about 7% by weight based on the weight of the nonsolvent medium and preferably not more than 5% should be introduced. This small quantity of water should be introduced into the system preferably after the polymerization reaction has been initiated and formation of polymer is under way. The water is preferably introduced in increments and, when employed in conjunction with a dispersing agent, may have dissolved therein a fractional amount of the total amount of dispersant or catalyst, part of which has been introduced at the initiation of the reaction. We have found that the introduction of a small quantity of water into the system substantially increases the conversion of monomer to polymer. When dispersing agents of the group above described are employed in combination with the small quantity of water, a highly desirable product of high molecular weight and in yields as high as 98% may be obtained.

The following examples in which the parts are parts by weight are set forth for the purposes of illustration only and any specific enumeration of details should not be interpreted as a limitation except as expressed in the appended claims.

EXAMPLE 1

Twenty-five parts of acrylamide, 25 parts of 25% Aerosol TR, bistridecyl sodium sulfosuccinate in mineral oil, Nujol, 300 parts of mineral oil, Nujol, and a mixture of 0.010 part of 90° pure benzoyl peroxide dissolved in 1 part of benzene were charged to a reaction flask. Nitrogen was passed into the reaction mixture throughout the entire operation. The temperature was raised to 70° C. 6 parts of water together with an additional 0.005 part of benzoyl peroxide are introduced after 20 minutes. The reaction was continued at 75° for 1 hour. Afterwards, the reaction product was filtered, washed first with benzene, followed by acetone three times. The air dried product was white powder, soluble in water completely. The molecular weight of the polymer is approximately 1.2 million by viscosity determination. The conversion is 96%.

EXAMPLE 2

To a 3-neck flask, there were charged 322.5 parts of n-heptane and 20.15 parts of Aerosol OT, dioctyl ester of sodium sulfosuccinic acid. The mixture was heated to reflux temperature and a clear solution was formed. Nitrogen was bubbled in while the solution was cooled. Twenty-five parts of the solution were taken out for subsequent use.

When the flask temperature reached 35° C., 80.7 parts of acrylamide, 6.4 parts of polyacrylamide, and 0.4 part of Porophor N, azo-bisisobutyronitrile, solution in benzene (2.66 g./50 ml.) were charged. The slurry was heated to 70° C. and maintained at that temperature. Polymerization proceeded smoothly. At the end of 90 minutes at 70° C., the conversion was 76%.

The 25 parts of Aerosol OT in heptane solution was shaken with 8.6 parts of water and a white emulsion formed. 15 parts of this emulsion was charged to the above reaction mixture at the end of 90 minutes, and the rest of the emulsion at the end of 150 minutes. Another sample was taken out before the second addition and the conversion was found to be 91%. At the end of 240 minutes, the conversion was found to be 98%. The estimated molecular weight is 1.4 million.

EXAMPLE 3

25.5 parts of crystalline solid acrylamide and 4.5 parts of acrylic acid were suspended in 300 parts of mineral oil, Nujol, to which had been added 23 parts of a 25% solution of Aerosol TR in mineral oil. No catalyst was used in this preparation. The mixture was heated to 70° C. for 15 minutes and 4 parts of water are added and held at that temperature for one hour. The copolymer formed was filtered from the Nujol and was washed free of Nujol with benzene and from unreacted monomers with acetone and the product dried. The conversion was 81%. A 1% solution of the dried product imparted excellent dry strength to paper when introduced into the pulp during manufacture.

EXAMPLES 4–10

The following examples, the composition and results of which are summarized in Table I, further show the advantages of the inventive improvement. The procedure employed is substantially that followed for Example 2, with omission of ingredients in those examples provided primarily for comparative purposes.

Table I
EXAMPLES 4-10

| Example | Monomer | Liquid Nonsolvent Medium | Dispersant | Percent (Based on Weight of Nonsolvent) | Percent Water in System | Catalyst, Percent on Monomer | Conversion, percent | Mol Wt. $\times 10^6$ |
|---|---|---|---|---|---|---|---|---|
| 4 | Acrylamide | n-heptane | None | 6 | None | Porofor N, 0.3 | 67 | 0.4 |
| 5 | do | do | Aerosol OT | 6 | None | do | 84 | 0.9 |
| 6 | do | hexane | Aerosol TR | 9 | 3 | Acetyl peroxide, 0.2. | 94 | 0.8 |
| 7 | do | n-heptane | N-octadecyl disodium sulfosuccinate. | 7 | 3.5 | Lauroyl peroxide, 0.1. | 97 | 1.5 |
| 8 | Methacrylamide | do | Aerosol OT | 5 | 4 | Benzoyl peroxide. | 94 | 0.8 |
| 9 | Acrylamide-Methacrylic acid (85/15). | hexane | Aerosol TR | 5 | 2 | Porofor N | 95 | 0.9 |
| 10 | Acrylamide | octyl chloride | Aerosol IB [1] | 8 | 4 | Benzoyl peroxide. | 93 | 1.1 |

[1] Diisobutyl sodium sulfosuccinate.

In ascertaining the molecular weight of the polymeric product, it is known that the molecular weight M of a polymer is related conveniently to intrinsic viscosity $[\eta]$ by an equation of the form: $[\eta]=kM^a$. Here $k$ and $a$ are constants whose value is determined by separate experiments in which molecular weight is measured by light scattering or by a similar absolute method. Information of this kind is given in various standard reference books on high polymers.

In the case of polyacrylamide, more detailed information on the relationship between intrinsic viscosity and molecular weight is available, i.e., $$[\eta]=3.73\times 10^{-4}M^{0.66}$$

This may be found in a publication of American Cyanamid Company, 30 Rockefeller Plaza, New York 20, N.Y., New Product Bulletin, No. 34, entitled Polyacrylyamide, published in June, 1955. The molecular weight of a polymer can be readily obtained if its intrinsic viscosity is determined.

The polymeric and copolymeric acrylamides prepared by the process of the present invention ordinarily have a molecular weight (weight average molecular weight) in excess of 50,000. Generally, the molecular weight is within the range of about 200,000 and 5,000,000. Molecular weights of other polymers will vary depending on such factors as monomer structure and polymerization temperature.

It will be understood by those skilled in the art that our invention is not limited to the specific details that are given by way of illustration in providing the foregoing examples. Thus, various other monomers which have the characteristics of being solid at room temperature, which have a melting point in excess of about 35° C. which are readily polymerizable with free radical initiating catalysts (including actinic light or heat alone) and which are insoluble in a suitable medium may be utilized in practicing the present invention. Included but not exclusive are preferably such monomers as acrylamide, methacrylamide, alone or copolymerized with acrylic acid, or methacrylic acid and the various salts of these acids such as potassium, calcium, and barium acrylates.

The advantages of the present invention will be immediately apparent to those skilled in the art from the foregoing description. The invention provides a useful and highly practical method of producing polymeric material; it avoids the presence of a solvent which must be removed; makes the resulting compositions suitable in applications for which aqueous solutions of polyacrylamide would be entirely unsuited; and it provides not only high conversion but desirable high molecular weight material.

As a result of the present invention, all of the inherent advantages of a nonaqueous solvent can be utilized in working with polymers and copolymers. Polyacrylamide and copolymers of acrylamide containing at least about 70% of acrylamide combined in the polymer molecule have been found to have excellent properties for the various uses set forth in the aforementioned Bulletin on polyacrylamide. For instance, the invention provides compositions which can be extruded or otherwise shaped to form useful articles of manufacture. The compositions of the present invention are also useful in warp-sizing and other textile-treating applications, paper treatment, as well as in adhesive compositions, ceramic binders, nitrocellulose lacquers, as components of rubber-based glues, in furniture glues which are capable of withstanding freeze-thaw cycles, and various other purposes, examples of which have been given hereinbefore.

We claim:
1. In a process for preparing solid polymers which comprises polymerizing vinyl monomers having a melting point above 35° C. and selected from the group consisting of acrylamide, methylol acrylamide, methacrylamide, methylene bisacrylamide and mixtures of said acrylamides with acrylic acid and methacrylic acid with a free radical polymerization catalyst in the solid state and below their melting point, said polymerization being conducted in a non-aqueous medium, said medium being an inert liquid organic nonsolvent for said monomers and for said polymers and having a boiling point in the range of from about 50° C. to 110° C., the improvement which comprises conducting the polymerization in the presence of from about 0.5% to about 20% by weight of an alkyl ester of an alkali metal sulfosuccinic acid salt as dispersant.

2. In a process for preparing solid polymers which comprises polymerizing vinyl monomers having a melting point above 35° C. and selected from the group consisting of acrylamide, methylol acrylamide, methacrylamide, methylene bisacrylamide and mixtures of said acrylamides with acrylic acid and methacrylic acid with a free radical polymerization catalyst in the solid state and below their melting point, said polymerization being conducted in a nonaqueous medium, said medium being an inert liquid organic nonsolvent for said monomers and for said polymers and having a boiling point in the range of from about 50° C. to 110° C., the improvement which comprises conducting the polymerization in the presence of from about 2% to not more than 7% by weight of water.

3. A method according to claim 1 wherein the polymerization is conducted in the presence of the said alkyl ester of an alkali metal sulfosuccinic acid salt and wherefrom about 2% to not more than 5% by weight of water is introduced during the polymerization reaction.

4. A method according to the procedure of claim 1 in which the sole monomer is acrylamide.

5. A method according to the procedure of claim 1 in which the sole monomers are a mixture of acrylamide and acrylic acid in a weight ratio not less than 7:3, respectively.

6. A method according to the procedure of claim 2 in which the sole monomer is acrylamide.

7. A method according to the procedure of claim 2 in which the sole monomers are a mixture of acrylamide and acrylic acid in a weight ratio not less than 7:3, respectively.

8. A method according to claim 1 wherein the dispersant is sodium dioctyl sulfosuccinate.

References Cited in the file of this patent

Mesrobian et al.: J. Chem. Phys. 22,565 (1954).